United States Patent
Shmueli et al.

(10) Patent No.: US 11,442,828 B2
(45) Date of Patent: Sep. 13, 2022

(54) HANDLING FAILURES IN DISTRIBUTED DATA SYSTEM

(71) Applicant: TECHNION RESEARCH & DEVELOPMENT FOUNDATION LIMITED, Haifa (IL)

(72) Inventors: Oded Shmueli, Nofit (IL); Itai Shaked, Jerusalem (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 17/262,730

(22) PCT Filed: Jul. 23, 2019

(86) PCT No.: PCT/IL2019/050837
§ 371 (c)(1),
(2) Date: Jan. 24, 2021

(87) PCT Pub. No.: WO2020/021548
PCT Pub. Date: Jan. 30, 2020

(65) Prior Publication Data
US 2021/0191830 A1    Jun. 24, 2021

Related U.S. Application Data

(60) Provisional application No. 62/701,904, filed on Jul. 23, 2018.

(51) Int. Cl.
*G06F 11/00* (2006.01)
*G06F 11/20* (2006.01)
(Continued)

(52) U.S. Cl.
CPC ...... *G06F 11/2097* (2013.01); *G06F 11/1402* (2013.01); *G06F 11/2094* (2013.01); *G06F 16/2365* (2019.01); *G06F 16/278* (2019.01)

(58) Field of Classification Search
CPC ............. G06F 2201/80; G06F 2201/84; G06F 11/1402; G06F 11/1472; G06F 11/2094;
(Continued)

(56) References Cited

U.S. PATENT DOCUMENTS

| | | | | |
|---|---|---|---|---|
| 2010/0106753 | A1* | 4/2010 | Prabhakaran | G06F 3/065 |
| | | | | 707/E17.001 |
| 2016/0004466 | A1* | 1/2016 | Lakshman | G06F 3/0665 |
| | | | | 711/114 |

(Continued)

FOREIGN PATENT DOCUMENTS

WO     2018185771 A1    10/2018

OTHER PUBLICATIONS

Hunt et al., "ZooKeeper: Wait-free coordination for Internet-scale systems", USENIXATC'10: Proceedings of the 2010 USENIX conference on USENIX annual technical conference, Jun. 23-25, 2010 (Year: 2010).*

(Continued)

*Primary Examiner* — Michael Maskulinski
(74) *Attorney, Agent, or Firm* — The Roy Gross Law Firm, LLC; Roy Gross

(57) ABSTRACT

A method comprising: prior to performing a planned i-th data movement in a distributed data system comprising a plurality of storage sites, generating (i) a first map of current locations of data item replicas following an immediately-preceding (i−1)-th data movement, (b) a first timestamp associated with a completion of said (i−1)-th data movement, and (c) a second map of expected locations of data item replicas following said i-th data movement; implementing said i-th data movement; generating, upon performing said i-th data movement, a second timestamp associated with a completion of said i-th data movement, wherein said second timestamp is indexed as i; and if a failure occurs with (Continued)

respect to at least one of said storage sites during said i-th data movement, determining a completion status of said i-th data movement, based on a comparison between said indexing of said second map and said indexing of said second timestamp.

20 Claims, 3 Drawing Sheets

(51) Int. Cl.
    *G06F 16/27*     (2019.01)
    *G06F 16/23*     (2019.01)
    *G06F 11/14*     (2006.01)

(58) Field of Classification Search
CPC . G06F 11/2097; G06F 16/2365; G06F 16/278
See application file for complete search history.

(56) References Cited

U.S. PATENT DOCUMENTS

2019/0340082 A1* 11/2019 Pradhan .................. G06F 16/27
2019/0377821 A1* 12/2019 Pleshachkov ......... G06F 16/273

OTHER PUBLICATIONS

Zhiming Shen, Qin Jia, Gur-Eyal Sela, Ben Rainero, Weijia Song, Robbert van Renesse, and Hakim Weatherspoon. 2016. Follow the Sun through the Clouds: Application Migration for Geographically Shifting Workloads. In Proceedings of the Seventh ACM Symposium on Cloud Computing (SoCC '16). Association for Computing Machinery, New York, NY, USA, 141-154. https://doi.org/10.1145/2987550.2987561.
O'Neil, P., Cheng, E., Gawlick, D., & O'Neil, E. (1996). The log-structured merge-tree (LSM-tree). Acta Informatica, 33 (4), 351-385. https://doi.org/10.1007/s002360050048.
Anastassia Ailamaki, David J. DeWitt, and Mark D. Hill. 2002. Data page layouts for relational databases on deep memory hierarchies. The VLDB Journal 11, 3 (Nov. 2002), 198-215. https://doi.org/10.1007/s00778-002-0074-9.
Sergey Melnik, Andrey Gubarev, Jing Jing Long, Geoffrey Romer, Shiva Shivakumar, Matt Tolton, and Theo Vassilakis. 2010. Dremel: interactive analysis of web-scale datasets. Proc. VLDB Endow. 3, 1-2 (Sep. 2010), 330-339. https://doi.org/10.14778/1920841.1920886.
Melnik, S., Gubarev, A., Long, J. J., Romer, G., Shivakumar, S., Tolton, M., & Vassilakis, T. (2011). Dremel. Communications of the ACM, 54(6), 114. doi:10.1145/1953122.1953148.
Günther Fliedl, Christian Kop, and Heinrich C. May 2005. From textual scenarios to a conceptual schema. Data Knowl. Eng. 55, 1 (Oct. 2005), 20-37. https://doi.org/10.1016/j.datak.2004.11.007.
Yingjun Wu, Wentian Guo, Chee-Yong Chan, and Kian-Lee Tan. 2017. Fast Failure Recovery for Main-Memory DBMSs on Multicores. In Proceedings of the 2017 ACM International Conference on Management of Data (SIGMOD 17). Association for Computing Machinery, New York, NY, USA, 267-281. https://doi.org/10.1145/3035918.3064011.
Verbitski, A., Gupta, A., Saha, D., Brahmadesam, M., Gupta, K., Mittal, R., Krishnamurthy, S., Maurice, S., Kharatishvili, T. and Bao, X., 2017, May. Amazon aurora: Design considerations for high throughput cloud-native Yelational databases. In Proceedings of the 2017 ACM International Conference on Management of Data (pp. 1041-1052).
D. F. Bacon, N. Bales, N. Bruno, B. F. Cooper, A. Dickinson, A. Fikes, C. Fraser, A. Gubarev, M. Joshi, E. Kogan, A. Lloyd, S. Melnik, R. Rao, D. Shue, C. Taylor, M. van der Holst, and D. Woodford. 2017. Spanner: Becoming a SQL System. In Proceedings of the 2017 ACM International Conference on Management of Data (SIGMOD '17). Association for Computing Machinery, New York, NY, USA, 331-343. https://doi.org/10.1145/3035918.3056103.
M. W. Convolbo, J. Chou, S. Lu and Y. C. Chung, "DRASH: A Data Replication-Aware Scheduler in Geo-Distributed Data Centers," 2016 IEEE International Conference on Cloud Computing Technology and Science (CloudCom), 2016, pp. 302-309, doi: 10.1109/CloudCom.2016.0056.
M. Hajjat, X. Sun, Y. E. Sung, D. Maltz, S. Rao, K. Sripanidkulchai, and M. Tawarmalani. 2010. Cloudward bound planning for beneficial migration of enterprise applications to the cloud. SIGCOMM Comput. Commun. Rev. 40, 4 (Oct. 2010), 243-254. https://doi.org/10.1145/1851275.1851212.
F. Hosseinpour, J. Plosila and H. Tenhunen, "An Approach for Smart Management of Big Data in the Fog Computing Context," 2016 IEEE International Conference on Cloud Computing Technology and Science (CloudCom), 2016, pp. 468-471, doi: 10.1109/CloudCom.2016.0080.
M. Jammal, H. Hawilo, A. Kanso and A. Shami, "Mitigating the Risk of Cloud Services Downtime Using Live Migration and High Availability-Aware Placement," 2016 IEEE International Conference on Cloud Computing Technology and Science (CloudCom), 2016, pp. 578-583, doi: 10.1109/CloudCom.2016.0100.
Elena Kakoulli and Herodotos Herodotou. 2017. OctopusFS: A Distributed File System with Tiered Storage Management. In Proceedings of the 2017 ACM International Conference on Management of Data (SIGMOD '17). Association for Computing Machinery, New York, NY, USA, 65-78. https://doi.org/10.1145/3035918.3064023.
L.-H. Chung, C.-F. Lee and J. Chou, "Dynamic Block Partitioning Strategy for Cloud-Backed File Systems," 2016 IEEE International Conference on Cloud Computing Technology and Science (CloudCom), 2016, pp. 253-260, doi: 10.1109/CloudCom.2016.0050.
B. Confais, A. Lebre and B. Parrein, "Performance Analysis of Object Store Systems in a Fog/Edge Computing nfrastructures," 2016 IEEE International Conference on Cloud Computing Technology and Science (CloudCom), 2016, pp. 294-301, doi: 10.1109/CloudCom.2016.0055.

* cited by examiner

HANDLING FAILURES IN DISTRIBUTED DATA SYSTEM

CROSS REFERENCE TO RELATED APPLICATIONS

This application is a National Phase Application of PCT Patent Application No. PCT/IL2019/050837 filed Jul. 23, 2019, which claims the benefit of priority of U.S. Provisional Patent Application No. 62/701,904, filed Jul. 23, 2018, the contents of which are all incorporated herein by reference in their entirety.

BACKGROUND

The invention relates to the field of distributed computing.

A distributed data system has multiple sites comprising servers. Each server may be a single computer, part of a computer (e.g., a partition on the computer's attached storage), several computers cooperating, or some combination of these (e.g., a collection of three distinct partitions on three distinct computers might constitute a single server). Data centers may use a distributed data system. A large number of data items may thus be stored on the servers or other storage nodes in the distributed storage system. However, data that is replicated across multiple locations presents challenges, such as the need to maintain data consistency and enable failure recovery when needed.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: prior to performing a planned i-th data movement in a distributed data system comprising a plurality of storage sites, generating (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i; implementing said i-th data movement; generating, upon performing said i-th data movement, a second timestamp associated with a completion of said i-th data movement, wherein said second timestamp is indexed as i; and if a failure occurs with respect to at least one of said storage sites during said i-th data movement, determining a completion status of said i-th data movement, based on a comparison between said indexing of said second map and said indexing of said second timestamp.

There is also provided, in an embodiment, a system comprising at least one hardware processor; and a non-transitory computer-readable storage medium having program code embodied therewith, the program code executable by said at least one hardware processor to: prior to performing a planned i-th data movement in a distributed data system comprising a plurality of storage sites, generate (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i; implement said i-th data movement; generate, upon performing said i-th data movement, a second timestamp associated with a completion of said i-th data movement, wherein said second timestamp is indexed as i; and if a failure occurs with respect to at least one of said storage sites during said i-th data movement, determine a completion status of said i-th data movement, based on a comparison between said indexing of said second map and said indexing of said second timestamp.

There is further provided, in an embodiment, a computer program product comprising a non-transitory computer-readable storage medium having program code embodied therewith, the program code executable by at least one hardware processor to: prior to performing a planned i-th data movement in a distributed data system comprising a plurality of storage sites, generate (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i; implement said i-th data movement; generate, upon performing said i-th data movement, a second timestamp associated with a completion of said i-th data movement, wherein said second timestamp is indexed as i; and if a failure occurs with respect to at least one of said storage sites during said i-th data movement, determine a completion status of said i-th data movement, based on a comparison between said indexing of said second map and said indexing of said second timestamp.

In some embodiments, the method further comprises storing, and the program instructions are further executable to store, said first map, said first timestamp, and said second map, in a specified directory at each of said storage sites.

In some embodiments, the method further comprises saving, and the program instructions are further executable to save, in each of said storage sites, information regarding a location of all said specified directories.

In some embodiments, when said indexing of said second timestamp is equal to said indexing of said second map, said completion status is successful.

In some embodiments, when said indexing of said second timestamp is lower than said indexing of said second map, said completion status is unsuccessful.

In some embodiments, the method further comprises performing, and the program instructions are further executable to perform, data recovery when said completion status is unsuccessful.

In some embodiments, when said failure comprises a failure of at least one instance of a global service registry, said recovery comprises using said global service registry to initiate one or more new instances of said global service registry.

In some embodiments, said global service registry is ZooKeeper.

In some embodiments, when said failure comprises a failure of all instances of said global service registry, said recovery comprises restoring at least some of said data items to said expected locations based, at least in part, on said second map.

In some embodiments, at least some of said data items are excluded from said recovery based, at least in part, when a location of each of said excluded data items corresponds to a respective expected location of said excluded data item.

In some embodiments, said correspondence is determined based, at least in part, on one of: a hashing function, and said second map.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
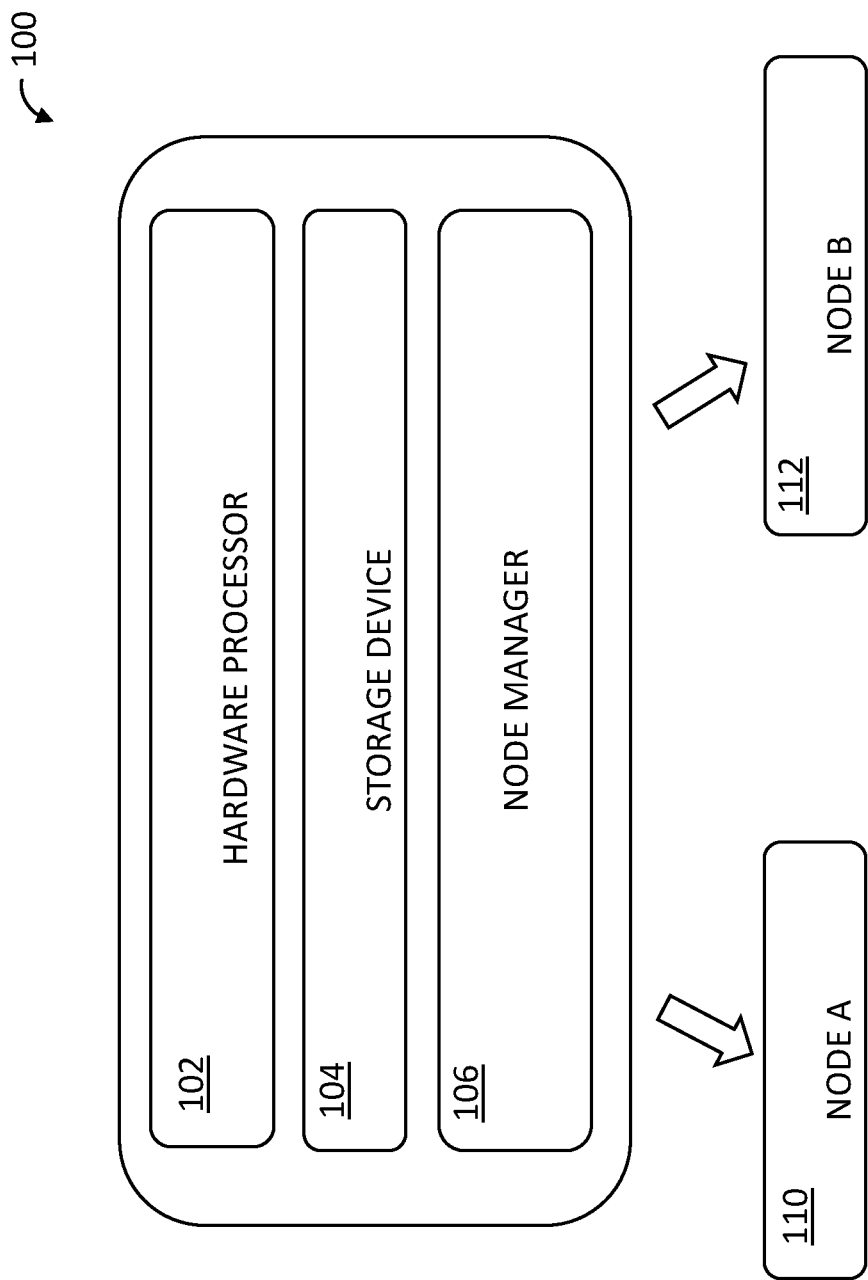
FIG. 1A is a block diagram of an exemplary system enabling automated handling of failures in distributed computer systems, according to an embodiment.

Disclosed herein are a system and method for automated handling of failures in distributed data systems, for the purpose of restoring data which may be replicated to a concurrent system state.

In some embodiments, the present invention deals with handling failures of one or more ZooKeeper nodes, in one or more system sites, and especially failures occurring during a data movement operation. During such a data movement operation, the system is in a state of flux regarding which replicas have been reassigned to which sites, which are in "new" and "old" locations. Therefore, failure during data movement is an especially vulnerable period that needs to be handled with special care.

In some embodiments, the distributed data system operates over a cluster comprising a plurality of sites, wherein the data, or portions thereof (e.g., in a database), may be replicated across said sites. Each piece of data, which is referred to as a 'tuple,' may be replicated in some of the sites. Examples of tuples may include a file, an object, a relational database row, a NoSQL column family data, etc. In some embodiments, a dedicated service, such as ZooKeeper or a similar system is used by the distributed system. As noted above, ZooKeeper is a distributed service used for maintaining configuration information, naming, providing distributed synchronization, and providing group services in distributed applications. In the present system context, ZooKeeper keeps track of tuples and their copies, or 'replicas.' Zookeeper's components that run concurrently are called ZooKeeper nodes or Zookeeper instances. In the present context, each ZooKeeper node runs on a server within a site of the distributed data system.

As noted above, distributed systems may have potential points of failure, such as transaction failures, due to an error in a transaction caused by incorrect input data or the detection of a present or potential deadlock; system failures due to a hardware or a software failure (e.g., loss of memory contents) causing a site to be unreachable from other sites in the distributed system; media failures due to failures of secondary storage devices that store the database, causing all or part of the database that is on the secondary storage to be considered destroyed and inaccessible; or communication failures due to, e.g., errors in the messages, improperly ordered messages, lost messages, and communication line failures.

The existence of potential failures requires a failure handling and recovery policy, to enable the system to deal with the same logical tuple (e.g., a row of the database) having concurrently existing differing replicas in different sites. Tuple replicas in the data system may be assigned timestamps indicating the time of the latest update they reflect. Assigned timestamps may be considered globally valid, either as recorded by ZooKeeper, or by using clock synchronization mechanisms (software-implemented or physically implemented such as by using atomic clocks). Some recovery options may be:

Latest-version recovery: In case of failure, using replicas' timestamps, tuple data will be restored to the latest known valid version (with a consistent ordering of sites used as a tiebreaker in case of distinct versions having the same timestamp). In case of a prolonged network failure, this policy may result in tuple replica data being overwritten with a newer version, even where the client application that used said tuple may not have meant for it to be overwritten.

Majority recovery: In case of failure, tuple data will be restored to the version held by the majority of known valid replicas. If no such majority exists, either because more than half the sites holding replicas of this tuple failed, or because no single version is held by a majority of the surviving sites, the tuple is restored according to the latest-version policy.

Site ordering: Total order of sites determines which version has priority. For example, if a tuple is on sites b and c, and b<c, then b's tuple version, if available, is used rather than c's version.

Application ordering: Similar to site ordering, but based on priority among applications. Application ordering and site ordering may be combined.

Failures may further be distinguished between two types: Failure of a ZooKeeper instance (i.e., a ZooKeeper node), and failure of a site on which a copy (replica) of a tuple resides. It is possible that a site failure will also cause a ZooKeeper instance to fail in case the ZooKeeper instance (node) runs within the failed site. However, it is important to distinguish between these two kinds of failures, as their handling is different. A failure of a system process at a site is treated as a site failure.

Accordingly, in some embodiments, the present disclosure provides for a process for automated handling of potential failures, by creating an infrastructure during normal system operation, which will enable system recovery in case of failure. In some embodiments, this infrastructure consists of a directory and files (both replicated) which generate a consistent ZooKeeper worldview and files which then enable creating 'legal,' i.e., acceptable according to system policy, versions of tuples; on a best-effort basis when all other ways fail.

FIG. 1A is a block diagram of an exemplary system 100 for automated handling of failures in distributed computer systems, according to an embodiment. System 100 may comprise one or more hardware processors 102, and a non-transitory computer-readable storage device 104. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device.

Storage medium 104 may have encoded thereon software instructions or components configured to operate a processing unit (also "hardware processor," "CPU," or simply "processor"), such as hardware processor(s) 102. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a node manager 106, configured to manage, e.g., nodes A 110 and B 112.

Figure 1B:
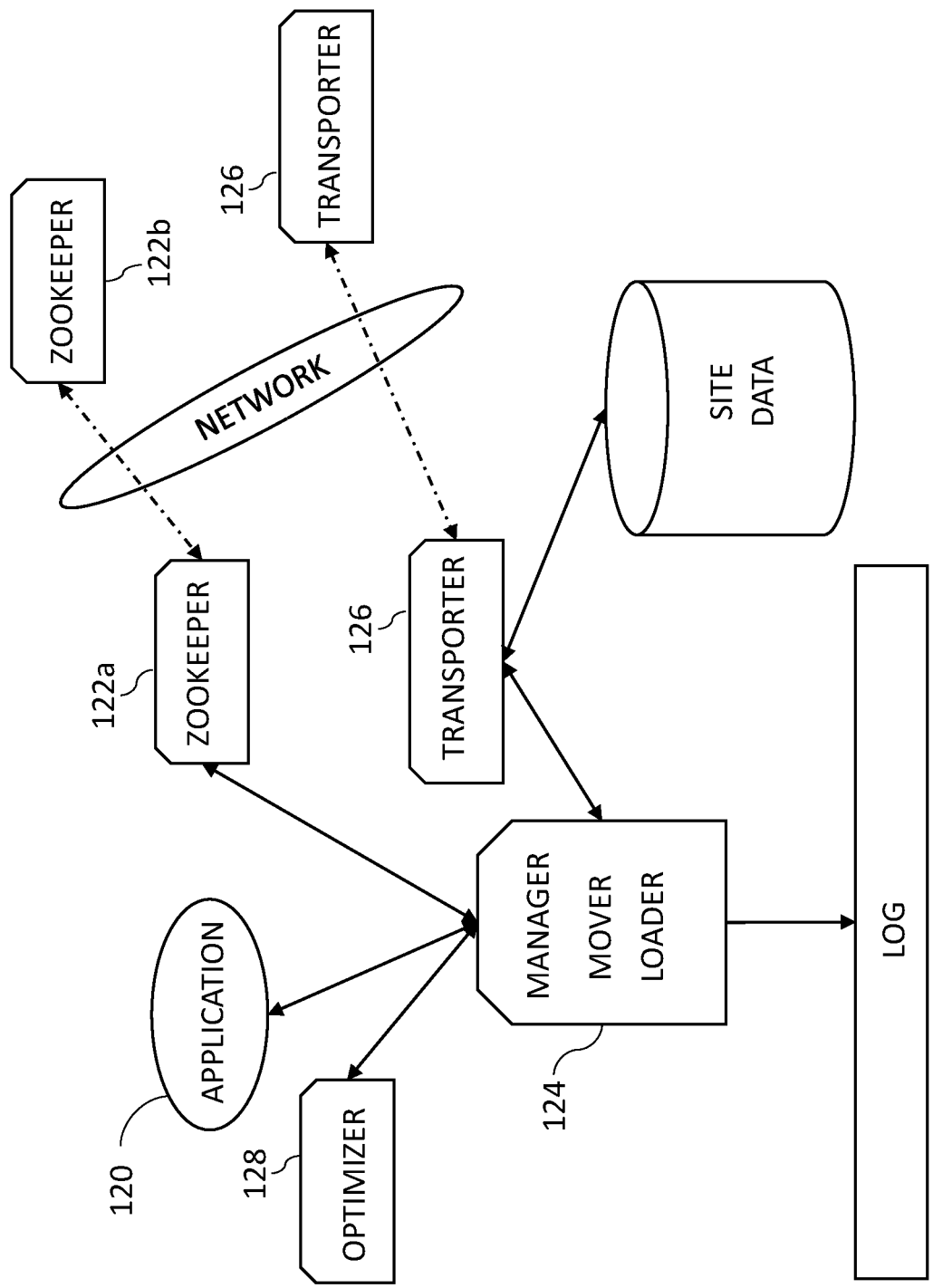
FIG. 1B is an exemplary architecture of a distributed data system, according to an embodiment.

FIG. 1B is an exemplary architecture of a distributed data system, according to an embodiment. In some embodiments, the data system of this disclosure is distributed across a plurality of sites. Applications, e.g., application 120, are external to the system and they access the system data items that are referred to as tuples. A data tuple may have one or more copies (referred to as replicas). In some embodiments, a dedicated service, such as, e.g., Apache ZooKeeper or a similar system is used by the distributed system. ZooKeeper is a distributed service, essentially a compact resilient distributed tree-structured replicated database. It is used for maintaining configuration information, naming, providing distributed synchronization, and providing group services in distributed applications. The Zookeeper nodes, e.g., 122a, 122b, are executed within the sites of the data system. The replicas locations may be stable or in transition during a data movement operation. During non-data-movement periods, applications access tuples by first communicating with their local site system manager component 124. The manager 124 in turn consults the local Zookeeper 122a node as to a tuple's location. If the tuple is not locally available, a transporter component 126 is charged with bringing a copy of the tuple by communicating with the transporter component 126 in a site from which it would like to obtain the tuple replica. An optimizer component 128 is in charge of determining the best placement of tuples' replicas, to achieve a desired system-wide objectives (e.g., resource optimization, cost reductions, latency reduction, recoverability potential, etc.). The Zookeeper nodes communicate with each other and reliably maintain a global directory as to the whereabouts of tuples' replicas. Based on various criteria, the optimizer may recommend changing the current placement of tuples' replicas. If the manager 124 approves the recommendation actual movement of tuples' replicas commences. During such data movement applications need adhere to specific rules, such as, e.g., described by the present inventors in International Patent Application No. WO 2018/185771, filed ON Apr. 5, 2018, which is incorporated herein by reference in its entirety.

In some embodiments, during recovery, the present disclosure provides for selecting among one or more available tuple versions, or detecting distinct copies of the same tuple. Because tuples may represent a large amount of data, in some embodiments, it is usually impractical to transfer the entire data in order to determine whether copies are identical or not. To overcome this, the present disclosure provides for a local data access mechanism at each site, which is configured to query a timestamp and/or version ID of any local tuple copy, as well as a hash function of the tuple data. In some embodiments, several hashing algorithms may be used, so long as all data sites use the same hashing algorithm (for example, MD5 or SHA1 may be used). The user should choose an algorithm which balances speed with accuracy. Some data storage facilities may have a built-in hashing mechanism which may be used to avoid lengthy calculations during recovery (when it is crucial to resume operation quickly). In some embodiments, the present disclosure provides for the ability of each local site to query each other data site for the timestamp and hash of every local copy of a tuple, so that the data transferred is minimal and independent of tuple sizes.

In some embodiments, in the case of latest-version, site-ordering, and application-ordering recovery policies, the present disclosure provides for first finding a canonical version of a tuple, by selecting the first copy in the appropriate order (querying possible locations for timestamp as needed). The hash of every copy is then queried, and only those copies whose hash matches that of the canonical version are retained.

In some embodiments, in the case of majority-based recovery algorithm the hash of every copy is queried, and the copies are divided into groups having equal hash values. The copies kept are those in the largest group, with ties broken according to the timestamp of the latest copy in each group.

Figure 2:
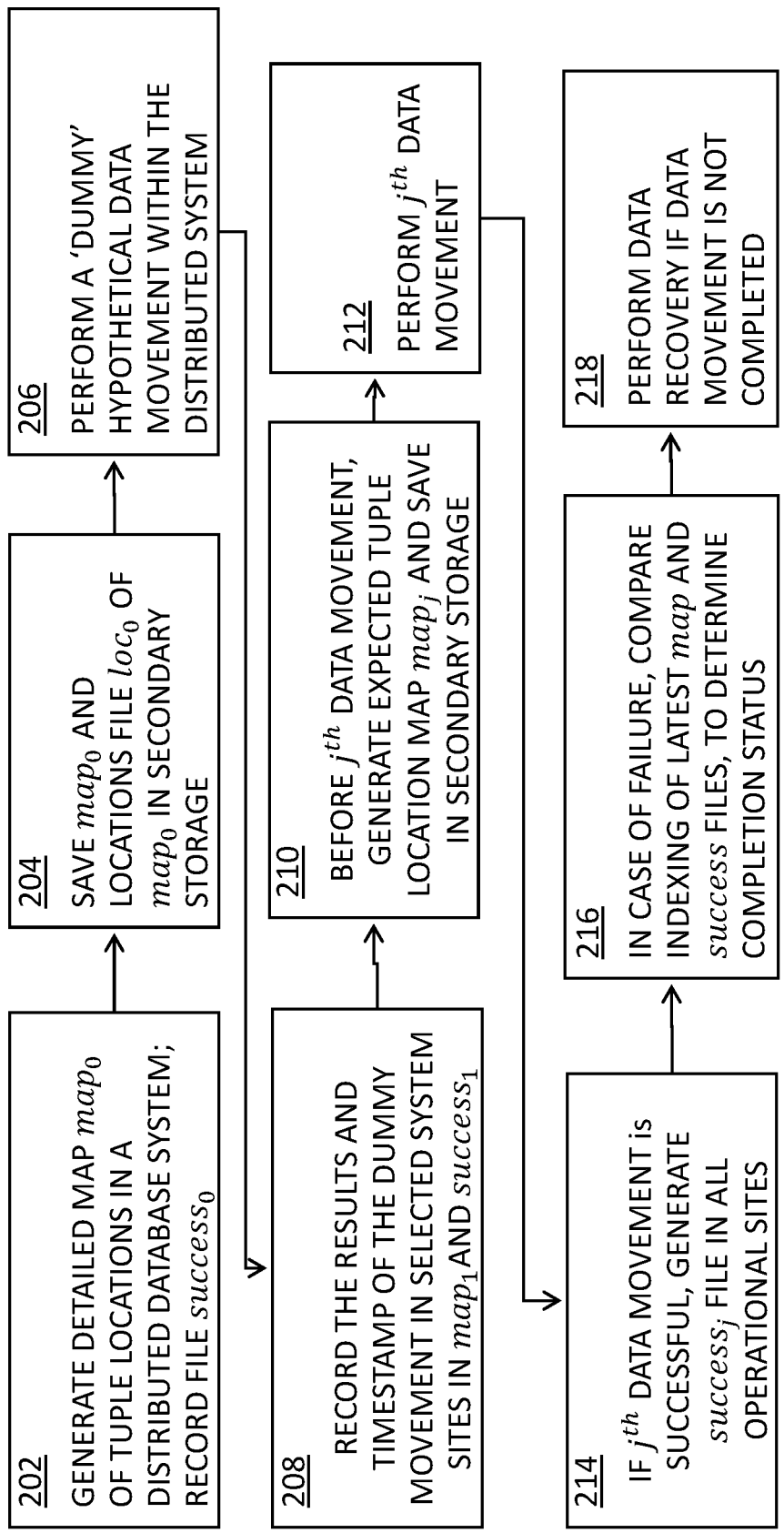
FIG. 2 is a flowchart of the functional steps in a method for automated handling if recovery of failures in distributed data systems, according to an embodiment.

FIG. 2 is a flowchart of the functional steps in a method for automated handling and recovery of failures in distributed computer systems, according to an embodiment. An exemplary scenario which may comprise the steps of FIG. 2 may involve the distributed data system optimizer component recommending a data rearrangement to the system manager. The system manager, once it approves actual data movement, then takes steps to ensure that any failures which may occur during the actual data movement, will be handled in a way the enables the distributed data system to establish a 'legal' global concurrent data state.

In some embodiments, at step 202, prior to beginning normal operation of a data database according to an embodiment, a detailed map of tuple locations is kept in a file $map_0$.

At step 204, before the present system starts its data movement operation, $map_0$ may be securely saved in stable storage (usually, secondary storage such as HDD or SSD) in $k_0$ (a system parameter) failure-independent locations. The locations of the file $map_0$ are kept in a file $loc_0$ on servers in all sites; $loc_0$ also stores the current system time of its creation.

At Step 206, in some embodiments, the present system then performs a simulated, i.e., hypothetical rather than actually-performed, 'dummy' data movement having no tuple changing its replicas' locations in the system.

At step 208, in some embodiments, the system records the results of the "dummy" hypothetical movement (that changes no tuple replicas' locations) by creating, in all operational sites, a copy of $loc_0$ called $loc_1$ representing tuple locations in file $map_1$, as well as files $success_0$ and $success_1$ that also record the current system time of their creation. In some embodiments, the file directory in which $map_0$, $loc_0$, $map_1$, $loc_1$, $success_0$, and $success_1$ are stored may be named 'recovery.' In some embodiments, the present system may then begin normal operation once $map_0$, $loc_0$, $map_1$, $loc_1$, $success_0$, and $success_1$ are securely stored.

At Step 210, in some embodiments, during operation, a $j^{th}$ data movement decision may be implemented by the present system, e.g., based on a recommendation by the optimizer component and approval by the system manager.

Upon a decision to implement the $j^{th}$ data movement, the system may store a map $map_{j-1}$ of the then-current, pre-$j^{th}$ data movement, locations of data item replicas. The system may then generate a file map of the of the planned new locations for data item replicas following the $j^{th}$ data movement.

The system then stores map securely in secondary storage, in $k_j$ failure-independent locations, where $1 \leq k_j \leq |S|$ is a parameter which may be reset by a user of the system, and $|S|$ is the number of sites. The location of the file $map_j$ is kept in a file $loc_j$ in all operational sites; $loc_j$ also contains the current system time. In some embodiments, the system may then begin actual data movement once $map_j$ and $loc_j$ are securely saved in the recovery directories.

In some embodiments, at step 212, the present system may begin actual data movement only if all the sites are operational at the start of moving and acknowledge writing the new $map_j$. This means that data movement may be delayed for a long time in case of a prolonged site failure. However, this may also ensure a consistent view of all sites as to when data movement takes place. To handle the case of a prolonged site failure, a failing site may be removed from the system altogether, and when it recovers, it may be considered a new site. Afterwards, the new site may rejoin the system during a new data movement operation.

In some embodiments, at step 214, only upon completion of the $j^{th}$ data movement, the system writes a short file named $success_j$ in all operational sites. The file contains a timestamp associated with the $j^{th}$ data movement completion, as determined by the system. Because $success_j$ is only generated upon successful completion of the $j^{th}$ data movement, the existence of $success_j$ is an indication of the completion of the data movement.

In some embodiments, at step 216, in case of system failures, the system may be configured to determine a completion status of the $j^{th}$ data movement based, at least in part, on a comparison between an indexing of the latest map file (e.g., $map_{j-1}$, map) and the indexing of the latest success file (e.g., $success_{j-1}$, $success_j$). When the indexing of the success file is lower than that of the latest map file, the system may determine that the $j^{th}$ data movement was not totally completed.

In some embodiments, at step 218, when the $j^{th}$ data movement was not completed, the system may be configured to perform one or more data recovery steps, depending on the type and scope of system failures.

In some embodiments, in the case of partial ZooKeeper failure (e.g., some sites on which ZooKeeper instances are running have failed or some ZooKeeper instances have failed for other reasons), ZooKeeper may be configured to bring one or more failed instances up to current ZooKeeper data state, and the present system may be configured to continue normal operation throughout this process.

In some embodiments, when all ZooKeeper instances have failed, the present system does not have any access to enterprise data. Accordingly, in some embodiments, the present system may be configured to bring ZooKeeper to a running condition. In so doing the system initializes the ZooKeeper database with tuples' replicas' location information as follows. In some embodiments, the present system may be configured to examine the file $loc_0$ previously maintained in any operational site. In some embodiments, this provides the system with the location of directory recovery in all sites. The present disclosure may then obtain, from all relevant operational sites, the two latest versions of the respective success files, e.g., $success_i$ and $success_{i-1}$, and of the loc files, e.g., $loc_j$ and $loc_{j-1}$. Using the loc files, the present disclosure may obtain also the two latest versions of map, e.g., e.g., $map_j$ and $map_{j-1}$.

In some embodiments, in the case that i=j, this means that the system successfully completed its $j^{th}$ data movement. Therefore, the up-to-date data locations may be obtained from any copy of $map_j$. This also means there was no ongoing data movement operation during the total failure of ZooKeeper, due to the consistency requirement and acknowledgement that all sites are operational at start of data movement. Thus, the system may simply continue operating as usual.

In some embodiments, in the case that i=j−1, this means that the system began its $j^{th}$ data movement, but was not able to complete it. In some embodiments, the implications for tuple locations are as follows:

Some tuples may be only located in their old locations, i.e., as indicated in $map_{j-1}$;
some tuples may only be located in their new locations, i.e., as indicated in $map_j$;
some tuples (e.g., those accessed by long duration readers) may be located in locations indicated by both $map_{j-1}$ and $map_j$. Note that tuple versions in these locations may be different (the later one is specified in map).

Accordingly, in some embodiments, the system may be configured to notify all running applications to abort, so as to ensure that applications bring data to a consistent state from their point of view. Applications use the data locations known to them in performing the abort operations. In some embodiments, the present system may then be configured to perform a restart, based on two option.

In some embodiments, a first option is a complete start, wherein the present system accesses the relevant versions of tuples. Based on their timestamps or other recovery criterion, the present system then determines the versions that need reinstatement. These latest versions are then used in creating a new complete version of the data in a single site, and the old version of all the system files are archived. The map describing the current data placement is saved at all sites. The system may then restart from this new complete data version. Subsequently, data movements will be performed so as to create tuple replicas as recommended by the system optimizer and approved by the system manager.

In some embodiments, a second option provides for examining tuples' replicas locations and determining which tuples are already present in their designated new locations (referred to as 'excluded tuples'), e.g., according to $map_j$. The system then starts a specified data move operation that moves only all the non-excluded tuples. Once this move operation commences, ordinary applications are notified that the system is operational and is performing a data move.

In some embodiments, some of the sites on which tuples are stored have failed. This implies that the present disclosure system and applications cannot access data on these sites. In this scenario, the present system may be configured to completely remove these failed sites from the system. Accordingly, an application trying to reach these sites would experience failure, which may lead to the application aborting the task or re-querying ZooKeeper for an alternative data tuple location. When a failed site comes back up, it will join the system as a completely new site, and data will be restored to it according to the defined recovery policy. This joining as a new site may be optimized, taking advantage of data already in the site, which is still valid.

In some embodiments, partial data site failures may lead to all copies (i.e., all replicas) of a tuple being lost. In this scenario, all the sites on which a certain tuple is stored have failed. In some embodiments, this situation may be handled by the system by:

Monitoring all the failed sites, and once a sufficient number are up, a proper version of that tuple (according to its recovery policy) may be introduced as the current tuple version into the system;

if an old version of the tuple is available from a most recent system backup (which may be performed periodically), this version may be sued as a best-effort version; or the two options above may be used concurrently, where the two versions may be resolved using a resolution program, said program may be heuristic and may be based on machine learning techniques, once they are both available.

In some embodiments, the present system may be subject to partial failure in at least one site. In some embodiments, the present system has a running process in all operational sites (e.g., the process which houses the manager, optimizer, and transporter functions). As long as one of these processes is running, new sites can join the system. However, if one such process fails during operation, requests directed at that process will not be answered, and this will cause an indication of a failure of that process. A running system process may then initiate bringing up a new system process instead of the failed one. However, if two such new processes are created, the one with the smaller ID will abort; this is done so that a site will have exactly one system process with which applications communicate at each site.

In some embodiments, the present system has completely failed, i.e., all processes running the present disclosure have failed. In that case, when the present disclosure is restarted in recovery-from-total-failure mode, it firsts aborts all running ZooKeeper instances. It then installs the present system processes on all operational sites. Then, it treats the situation as a total ZooKeeper failure (as detailed above).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    prior to performing a planned i-th data movement in a distributed data system comprising a plurality of storage sites, generating (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i;
    implementing said i-th data movement;
    generating, upon performing said i-th data movement, a second timestamp associated with a completion of said i-th data movement, wherein said second timestamp is indexed as i; and
    if a failure occurs with respect to at least one of said storage sites during said i-th data movement, determining a completion status of said i-th data movement, based on a comparison between said indexing of said second map and said indexing of said second timestamp.

2. The method of claim 1, further comprising storing said first map, said first timestamp, and said second map, in a specified directory at each of said storage sites.

3. The method of claim 2, further comprising saving, in each of said storage sites, information regarding a location of all said specified directories.

4. The method of claim 1, wherein, when said indexing of said second timestamp is equal to said indexing of said second map, said completion status is successful.

5. The method of claim 1, wherein when said indexing of said second timestamp is lower than said indexing of said second map, said completion status is unsuccessful.

6. The method of claim 5, further comprising performing data recovery when said completion status is unsuccessful, and wherein, when said failure comprises a failure of at least one instance of a global service registry, said recovery comprises using said global service registry to initiate one or more new instances of said global service registry.

7. The method of claim 6, wherein, when said failure comprises a failure of all instances of said global service registry, said recovery comprises restoring at least some of said data items to said expected locations based, at least in part, on said second map.

8. The method of claim 7, wherein at least some of said data items are excluded from said recovery based, at least in part, when a location of each of said excluded data items corresponds to a respective expected location of said excluded data item, and wherein said correspondence is determined based, at least in part, on one of: a hashing function, and said second map.

9. A system comprising:
    at least one hardware processor; and
    a non-transitory computer-readable storage medium having program code embodied therewith, the program code executable by said at least one hardware processor to
        prior to performing a planned i-th data movement in a distributed data system comprising a plurality of storage sites, generate (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i;
        implement said i-th data movement;
        generate, upon performing said i-th data movement, a second timestamp associated with a completion of said i-th data movement, wherein said second timestamp is indexed as i; and
        if a failure occurs with respect to at least one of said storage sites during said i-th data movement, determine a completion status of said i-th data movement, based on a comparison between said indexing of said second map and said indexing of said second timestamp.

10. The system of claim 9, wherein said program instructions are further executable to store said first map, said first timestamp, and said second map, in a specified directory at each of said storage sites.

11. The system of claim 10, wherein said program instructions are further executable to save, in each of said storage sites, information regarding a location of all said specified directories.

12. The system of claim 9, wherein, when said indexing of said second timestamp is equal to said indexing of said second map, said completion status is successful.

13. The system of claim 9, wherein when said indexing of said second timestamp is lower than said indexing of said second map, said completion status is unsuccessful.

14. The system of claim 13, wherein said program instructions are further executable to perform data recovery when said completion status is unsuccessful, and wherein, when said failure comprises a failure of at least one instance of a global service registry, said recovery comprises using said global service registry to initiate one or more new instances of said global service registry.

15. The system of claim 14, wherein, when said failure comprises a failure of all instances of said global service registry, said recovery comprises restoring at least some of said data items to said expected locations based, at least in part, on said second map.

16. The system of claim 15, wherein at least some of said data items are excluded from said recovery based, at least in part, when a location of each of said excluded data items corresponds to a respective expected location of said excluded data item, and wherein said correspondence is determined based, at least in part, on one of: a hashing function, and said second map.

17. A computer program product comprising a non-transitory computer-readable storage medium having program code embodied therewith, the program code executable by at least one hardware processor to:

prior to performing a planned i-th data movement in a distributed data system comprising a plurality of storage sites, generate (i) a first map of current locations of data item replicas following an immediately-preceding (i−1)-th data movement, wherein said first map is indexed as i−1, (b) a first timestamp associated with a completion of said (i−1)-th data movement, wherein said first timestamp is indexed as i−1, and (c) a second map of expected locations of data item replicas following said i-th data movement, wherein said second map is indexed as i;

implement said i-th data movement;

generate, upon performing said i-th data movement, a second timestamp associated with a completion of said i-th data movement, wherein said second timestamp is indexed as i; and if a failure occurs with respect to at least one of said storage sites during said i-th data movement, determine a completion status of said i-th data movement, based on a comparison between said indexing of said second map and said indexing of said second timestamp.

18. The computer program product of claim 17, wherein said program instructions are further executable to store said first map, said first timestamp, and said second map, in a specified directory at each of said storage sites.

19. The computer program product of claim 18, wherein said program instructions are further executable to save, in each of said storage sites, information regarding a location of all said specified directories.

20. The computer program product of claim 17, wherein, when said indexing of said second timestamp is equal to said indexing of said second map, said completion status is successful, and wherein when said indexing of said second timestamp is lower than said indexing of said second map, said completion status is unsuccessful.

* * * * *